United States Patent
Mullins et al.

(10) Patent No.: US 9,659,381 B2
(45) Date of Patent: May 23, 2017

(54) REAL TIME TEXTURE MAPPING FOR AUGMENTED REALITY SYSTEM

(71) Applicant: DAQRI, LLC, Los Angeles, CA (US)

(72) Inventors: Brian Mullins, Sierra Madre, CA (US); Matthew Kammerait, West Hollywood, CA (US); Mark Anthony Sararu, Los Angeles, CA (US); Andrew Thomas Krage, Los Angeles, CA (US); Gregory Khachaturyan, Los Angeles, CA (US)

(73) Assignee: DAQRI, LLC, Los Angeles, CA (US)

( * ) Notice: Subject to any disclaimer, the term of this patent is extended or adjusted under 35 U.S.C. 154(b) by 152 days.

(21) Appl. No.: 14/605,249

(22) Filed: Jan. 26, 2015

(65) Prior Publication Data
US 2016/0217590 A1   Jul. 28, 2016

(51) Int. Cl.
| | |
|---|---|
| G09G 5/00 | (2006.01) |
| G06T 7/40 | (2017.01) |
| G06T 19/00 | (2011.01) |
| G06K 9/00 | (2006.01) |
| G06T 15/04 | (2011.01) |

(52) U.S. Cl.
CPC .......... *G06T 7/40* (2013.01); *G06K 9/00671* (2013.01); *G06T 15/04* (2013.01); *G06T 19/006* (2013.01); *G06T 2215/16* (2013.01)

(58) Field of Classification Search
None
See application file for complete search history.

(56) References Cited

U.S. PATENT DOCUMENTS

| | | | |
|---|---|---|---|
| 6,975,334 B1* | 12/2005 | Barrus | G06T 15/04 345/582 |
| 8,803,912 B1* | 8/2014 | Fouts | G06T 19/006 345/629 |
| 2009/0123045 A1* | 5/2009 | Quadling | G06T 15/04 382/128 |
| 2009/0237328 A1* | 9/2009 | Gyorfi | G06F 3/011 345/9 |
| 2010/0277468 A1 | 11/2010 | Lefevre et al. | |

(Continued)

FOREIGN PATENT DOCUMENTS

WO    WO-2016122973 A1    8/2016

OTHER PUBLICATIONS

"International Application Serial No. PCT/US2016/014453, International Search Report mailed Apr. 11, 2016", 2 pgs.

(Continued)

*Primary Examiner* — David H Chu
(74) *Attorney, Agent, or Firm* — Schwegman Lundberg & Woessner, P.A.

(57) ABSTRACT

A system and method for real-time texture mapping for an augmented reality system are described. A viewing device includes an optical sensor to capture an image of a real-world object. A texture extraction module extracts a texture of the image of the real-world object. A recognition module identifies the real-world object based on the captured image. A texture mapping module retrieves a virtual object corresponding to the identified real-world object, maps the texture to the virtual object, dynamically updates the texture to the virtual object in real time, and generates a visualization of the virtual object in a display of the viewing device.

23 Claims, 13 Drawing Sheets

(56) References Cited

U.S. PATENT DOCUMENTS

| | | | |
|---|---|---|---|
| 2011/0304611 A1* | 12/2011 | Suzuki | G06T 19/006 345/419 |
| 2012/0069051 A1* | 3/2012 | Hagbi | G06T 19/006 345/633 |
| 2012/0094773 A1 | 4/2012 | Suzuki | |
| 2013/0286004 A1* | 10/2013 | McCulloch | G06T 19/006 345/419 |
| 2014/0125651 A1* | 5/2014 | Sharp | G06T 15/04 345/419 |
| 2014/0267412 A1* | 9/2014 | Calian | G09G 5/377 345/633 |
| 2015/0009206 A1* | 1/2015 | Arendash | G06T 19/006 345/419 |
| 2015/0022444 A1* | 1/2015 | Ooi | G06F 3/011 345/156 |
| 2015/0243086 A1* | 8/2015 | Denis | G06T 19/006 345/633 |
| 2015/0254903 A1* | 9/2015 | Sumner | G06T 19/006 345/420 |
| 2016/0225164 A1* | 8/2016 | Tomlin | G06T 7/00 |

OTHER PUBLICATIONS

"International Application Serial No. PCT/US2016/014453, Written Opinion mailed Apr. 11, 2016", 4 pgs.

\* cited by examiner

REAL TIME TEXTURE MAPPING FOR AUGMENTED REALITY SYSTEM

TECHNICAL FIELD

The subject matter disclosed herein generally relates to the processing and visualization of data. Specifically, the present disclosure addresses systems and methods for real-time texture mapping for an augmented reality system.

BACKGROUND

An augmented reality (AR) device can be used to generate and display data in addition to an image captured with the device. For example, AR provides a live, direct or indirect view of a physical, real-world environment whose elements are augmented by computer-generated sensory input such as sound, video, graphics or GPS data. With the help of advanced AR technology (e.g., adding computer vision and object recognition) the information about the surrounding real world of the user becomes interactive. Device-generated (e.g., artificial) information about the environment and its objects can be overlaid on the real world.

BRIEF DESCRIPTION OF THE DRAWINGS

Some embodiments are illustrated by way of example and not limitation in the figures of the accompanying drawings.

DETAILED DESCRIPTION

Figure 1:
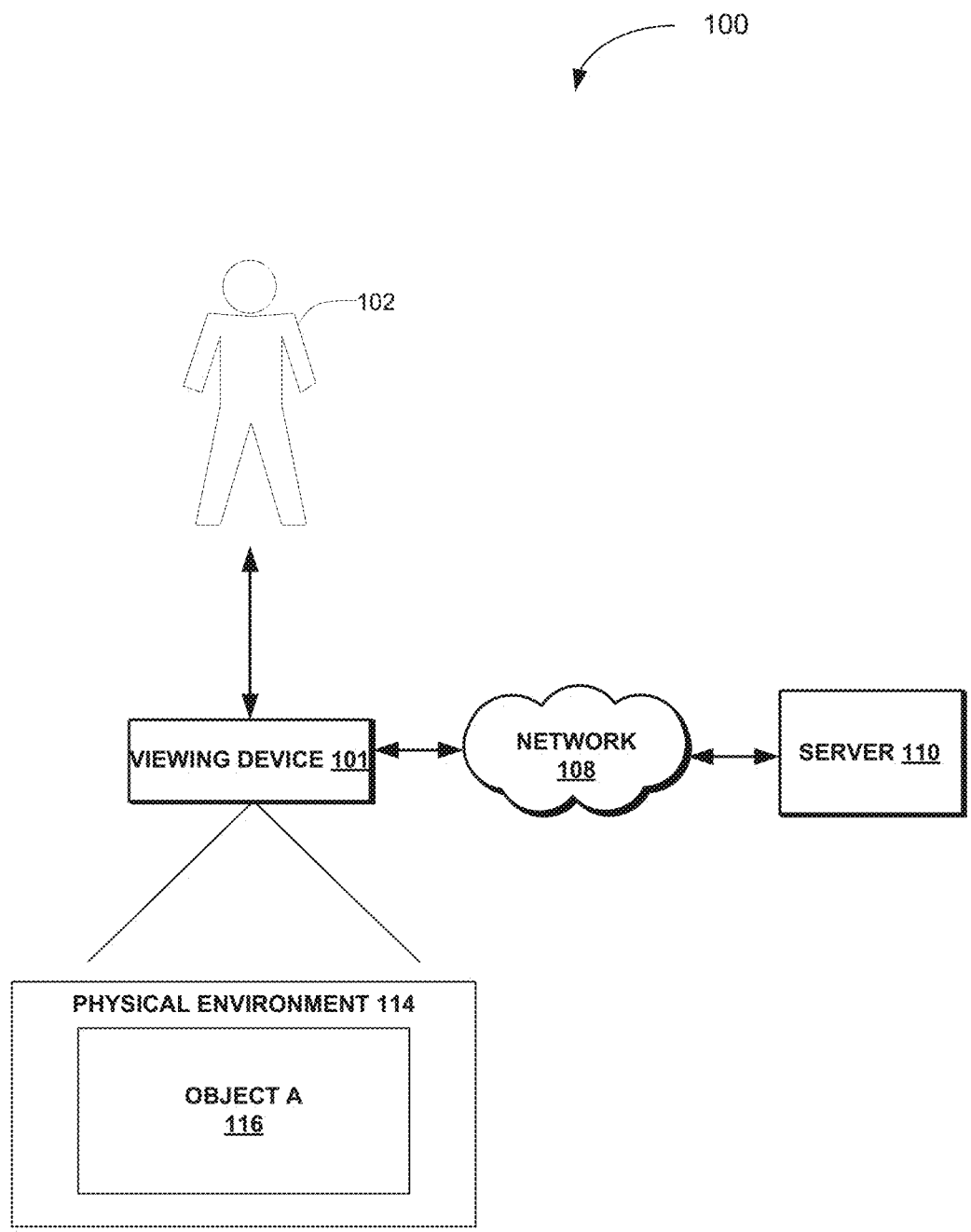
FIG. 1 is a block diagram illustrating an example of a network environment suitable for implementing an augmented reality system, according to some example embodiments.

Example methods and systems are directed to real-time texture mapping for an augmented reality (AR) system and using the texture in real time to generate or modify a virtual object in the AR system. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

AR applications allow a user to experience information, such as in the form of a virtual object such as a three-dimensional virtual object overlaid on an image of a physical object captured with a camera of a viewing device. The physical object may include a visual reference (e.g., a recognized image, pattern, or object) that the AR application can identify. A visualization of the additional information, such as the three-dimensional virtual object overlaid or engaged with an image of the physical object, is generated in a display of the viewing device. The three-dimensional virtual object may be selected based on the recognized visual reference or captured image of the physical object. A rendering of the visualization of the three-dimensional virtual object may be based on a position of the display relative to the visual reference. Other AR applications allow a user to experience visualization of the additional information overlaid on top of a view or an image of any object in the real physical world. The virtual object may include a three-dimensional or a two-dimensional virtual object. For example, the three-dimensional virtual object may include a three-dimensional model of a toy or an animated dinosaur. The two-dimensional virtual object may include a two-dimensional view of a dialog box, menu, or written information such as statistics information for properties or physical characteristics of the object (e.g., temperature, humidity, color). An image of the virtual object may be rendered at the viewing device or at a server in communication with the viewing device.

A user may view the virtual object visually perceived as an overlay onto the image or a view of the real-world object using a viewing device. The viewing device may include a mobile computing device such as a smartphone, hand held AR viewer, a head mounted display system, computing glasses, and other types of wearable devices.

The viewing device may include a system for real-time texture mapping for an AR reality system. In one example embodiment, the viewing device includes an optical sensor, a texture extraction module, and a texture mapping module. The optical sensor captures an image of a real-world object or image. The texture extraction module of the viewing device extracts the texture, color, or other characteristics of the real-world object or image. For example, the real-world object may include a drawing of a cartoon character on a piece of paper. The user may have colored the cartoon character using colored crayons, pencils, or markers. The texture extraction module extracts the pattern and color of a picture of the colored cartoon character. For example, the texture extraction module extracts the color, pattern, and texture of the coloring (e.g., watercolor texture, crayon texture, pencil texture) within a predefined outline of the cartoon character. The texture mapping module then maps the texture extracted from the image of the real-world object to a virtual object associated with the real-world object. For example, the extracted texture may be mapped to a texture of a three-dimensional model of the virtual object. Using the previous example, the color, pattern, and texture from the colored cartoon character is mapped to the surface of the three-dimensional model of the same cartoon character. The texture extraction module works in conjunction with the texture mapping module to dynamically map updates from the extracted texture to the virtual object in real time. As such, changes to the texture of the image of the colored cartoon are applied and mapped to the virtual object in real time. For example, the texture of the virtual object is dynamically updated in real time as the user colors the drawing of the cartoon character on the piece of paper. As such, the viewing device does not have to re-initiate recognition of the real-world object, re-render a three-dimensional model of a virtual object associated with the recognized real-world object, or re-map the new texture to the re-rendered three-dimensional model.

In one example embodiment, the viewing device includes a display, an optical sensor, and a hardware processor. The hardware processor includes an augmented reality (AR) application comprising a recognition module, a texture extraction module, and a texture mapping module. The recognition module identifies the real-world object and retrieves a virtual content associated with the real-world object. The recognition module may further retrieve characteristics (e.g., specific animation, behavior, color, effect) that are based on the texture in the image of the real-world object. The texture extraction module captures an image of a real-world object with the optical sensor and extracts a texture of the image of the real-world object. The texture may include a color and a visual pattern in an image of the real-world object. The texture mapping module retrieves a virtual object corresponding to the identified real-world object, maps the texture to the virtual object, dynamically updates the texture to the virtual object in real time, and generates a visualization of the virtual object in a display of the viewing device.

In another example embodiment, the texture extraction module identifies one or more predefined area in the image of the real-world object and extracts one or more texture from the one or more predefined area in the image of the real-world object.

The texture mapping module may map the texture of a predefined area in the image of the real-world object to a corresponding area of the virtual object. For example, the texture mapping module maps the texture of the predefined area to a corresponding surface in a three-dimensional model of the virtual object.

The texture mapping module may retrieve the virtual content and characteristics of the virtual content corresponding to a recognized image of the real-world object. The texture mapping module detects changes in the texture in the image of the real-world object, identifies portions of the image of the real-world object with texture changes, and dynamically updates in real time a mapping of texture to parts of the virtual content corresponding to the portions of the image with texture changes. The texture mapping module also renders a three-dimensional model of the virtual content in the display of the viewing device. The three-dimensional model may be visually perceived in the viewing device as an overlay on top of the captured image using the viewing device.

The texture mapping module may also dynamically update in real time a rendering of portions of the three-dimensional model of the virtual content corresponding to the portions of the image with texture changes. The texture extraction module extracts a texture of an image of the real-world object on a periodic basis. The texture mapping module updates a mapping of the texture to the virtual object on the periodic basis.

The texture extraction module may extract a texture of an image of the real-world object on a periodic basis. The texture mapping module updates a mapping of the texture to the virtual object in response to detecting changes in the texture of the image of the real-world object.

In another example embodiment, the viewing device includes a head-mounted device with a transparent display. The texture mapping module renders the visualization of the virtual content in the transparent display visually perceived as an overlay on a real-world object.

FIG. 1 is a block diagram illustrating an example of a network environment 100 suitable for implementing an augmented reality system, according to some example embodiments. The network environment 100 includes a viewing device 101 and a server 110, communicatively coupled to each other via a network 108. The viewing device 101 and the server 110 may each be implemented in a computer system, in whole or in part, as described below with respect to FIGS. 2 and 5.

The server 110 may be part of a network-based system. For example, the network-based system includes a cloud-based server system that provides additional information, such as three-dimensional models or other virtual objects and corresponding characteristics, to the viewing device 101 based on a color value of a region in a captured image.

A user 102 may utilize the viewing device 101 to capture a view of a real world physical environment 114 (e.g., a room, a desk, a hallway) having one or more physical objects (e.g., object A 116—such as a piece of paper, a magazine, a child's toy, markings on a floor in a factory) viewed by the user 102. The user 102 may be a human user (e.g., a human being), a machine user (e.g., a computer configured by a software program to interact with the viewing device 101), or any suitable combination thereof (e.g., a human assisted by a machine or a machine supervised by a human). The user 102 is not part of the network environment 100, but is associated with the viewing device 101 and may be a user 102 of the viewing device 101. For example, the viewing device 101 may be a computing device with a display such as a smartphone, a tablet computer, a wearable computing device (e.g., watch or glasses), or a head-mounted computing device (e.g., helmet). A tablet computer may be held up to view the object A 116 through a display of the tablet computer. The computing device may be hand held or may be removably mounted to the head of the user 102. In one example, the display may be a screen that displays what is captured with a camera of the viewing device 101. In another example, the display of the viewing device 101 may be transparent or semi-transparent such as in lenses of wearable computing glasses or the visor of a helmet.

The user 102 may be a user of an AR application in the viewing device 101 and at the server 110. The AR application in the viewing device 101 may optionally communicate with the AR application in the server 110 to access AR content. The AR application may provide the user 102 with an augmented experience triggered by identified objects and/or texture of the identified object in the physical environment 114. The augmented experience may be in the form of a virtual object based on texture and color values within the captured image of the real-world object A 116. In one example embodiment, the surface texture of the virtual object may be based on the captured texture of the object A 116. For example, a red crayon coloring of a drawing of car may cause a virtual car to be displayed with the same red crayon color or a similar color mapped to the red crayon coloring. In another example, the virtual object may have predefined behaviors such as generated sports car noise associated red crayon colors or textures. The behavior of the virtual object may refer to how the virtual object is animated or behaves in response to a texture or color value. For example, a bright red color value may cause a virtual fire log to burst into flames. A light blue color value may cause virtual waves to move gently.

In another example, the viewing device 101 retrieves and displays a virtual object (e.g., a virtual dog) that is associated with the object A 116 (e.g., a drawing of a dog on a piece of paper). The virtual object may include a three-dimensional model of the dog with skin color extracted from the color of the dog on the piece of paper. For example, the drawing of the dog is colored using brown crayons. The virtual dog may then be textured with the same brown crayon color, or a brown color from different media types (e.g., paint, pencil). Furthermore, the virtual dog may act or behave in a specific manner based on the color or texture in specific portions of the object A 116. For example, a red marker on the collar of the dog in the drawing causes the viewing device 101 to animate the virtual brown dog to jump and bark loudly. A red pencil color on the collar of the dog may cause the virtual brown dog to jump and bark softly.

The physical environment 114 may include identifiable objects such as a two-dimensional physical object (e.g., a picture of a dog), a three-dimensional physical object (e.g., a toy or an action figure), a location (e.g., at the bottom floor of a house), or any references (e.g., perceived corners of walls or furniture) in the real-world physical environment 114. For example, the user 102 may point a camera of the viewing device 101 to capture an image of real-world object A 116.

In one example embodiment, the objects in the image are tracked and recognized locally in the viewing device 101 using a local context recognition dataset or any other previously stored dataset of the augmented reality application of the viewing device 101. The objects in the image may be recognized patterns on a drawing (e.g., dogs, characters, scenery). The local context recognition dataset module may include a library of virtual objects associated with real-world physical objects or references. In one example, the viewing device 101 identifies feature points in an image of the object A 116 to determine different planes (e.g., edges, corners, surface). The viewing device 101 also identifies tracking data related to the object A 116 (e.g., GPS location, orientation and position of the object A 116 relative to the viewing device 101, etc.). In another example embodiment, if the captured image is not recognized locally at the viewing device 101, the viewing device 101 downloads additional information (e.g., the three-dimensional model) corresponding to the captured image, from a database of the server 110 over the network 108.

In another example embodiment, the object A 116 in the captured image is tracked and recognized remotely at the server 110 using a remote context recognition dataset or any other previously stored dataset of an AR application at the server 110. The remote context recognition dataset module may include, for example, a library of virtual objects and characteristics associated with detected colors of the object A 116. For example, the viewing device 101 may have a limited library of a context recognition dataset. If the viewing device 101 does not recognize a pattern or a drawing, the viewing device 101 sends an image of the drawing to the server 110 to determine a new virtual object associated with a portion of the image of the drawing. The viewing device 101 then downloads the new virtual object from the server 110. In another example, the viewing device 101 recognizes the object A 116 and queries the server 110 for updates to the virtual object associated with the object A 116. For example, the viewing device 101 recognizes a drawing of a cartoon character and queries the server 110 for additional effects related to the cartoon character that are dependent on the texture or color of the cartoon character. The viewing device 101 determines that a new power (e.g., firing a laser gun) is available for the cartoon character and downloads the updated virtual object (e.g., a 3D model of a virtual character firing a laser gun) or new feature to the virtual object. Other features may include additional accessories to the cartoon character. For example, a new dress or a tiara is available for the virtual character associated with the colored cartoon character.

As such, the nature of a virtual object (e.g., a three-dimensional model of a truck) may be determined based on a combination of the recognized object A 116 (e.g., a drawing of a truck) and the texture of the object A 116 (e.g., the truck is red). Furthermore, the behavior of the virtual object (e.g., music, sound, and animation of a steam train engine) may be determined based on a combination of the recognized object A 116 (e.g., a drawing of a steam train) and the texture of the object A 116 (e.g., the train is colored with blue crayons).

In another example embodiment, the viewing device 101 includes sensors to measure physical properties of the object A 116. Examples of measured physical properties may include but are not limited to: color, shades, weight, pressure, temperature, velocity, direction, position, intrinsic and extrinsic properties, acceleration, and dimensions. The sensors may also be used to track the location, movement, and orientation of the viewing device 101. The sensors may include optical sensors (e.g., depth-enabled 3D camera), wireless sensors (Bluetooth, Wi-Fi), GPS sensor, and audio sensor to determine the location of the viewing device 101, the orientation of the viewing device 101 to track what the user 102 is looking at (e.g., the direction at which the viewing device 101 is pointed, e.g., the viewing device 101 is pointed towards a drawing on a wall or on a table, markings on a floor). The sensors may be embedded in a head-mounted device.

In another example embodiment, data from the internal sensors in the viewing device 101 may be used for analytics data processing at the server 110 (or another server) for analysis on usage and how the user 102 is interacting with the physical environment 114. Live data from other servers may also be used in the analytics data processing. For example, the analytics data may track at what locations (e.g., points or features) on the physical or virtual object the user 102 has looked, how long the user 102 has looked at each location on the physical or virtual object, how the user 102 held the viewing device 101 when looking at the physical or virtual object, with which features of the virtual object the user 102 interacted with (e.g., such as whether a user 102 tapped on a part of the virtual object, e.g., a user pets a virtual dog on the head), and any suitable combination thereof. The tracking may be performed by tracking the position of the viewing device 101 relative to the object A 116, or by using front cameras in the viewing device 101 to track an eye gaze of the user 102.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 8-11. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
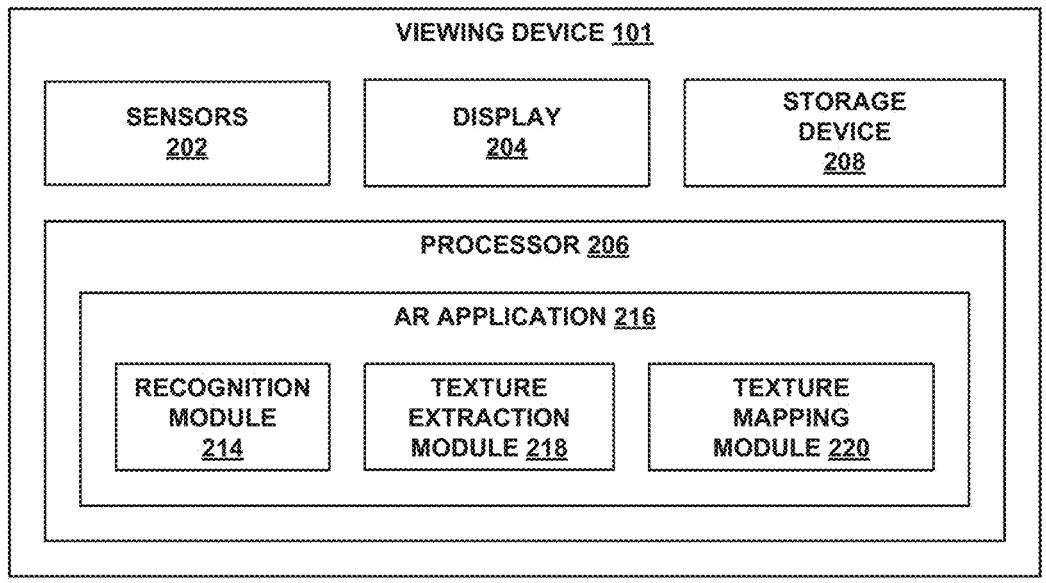
FIG. 2 is a block diagram illustrating an example embodiment of modules (e.g., components) of a viewing device.

FIG. 2 is a block diagram illustrating an example embodiment of modules (e.g., components) of the viewing device 101. The viewing device 101 may include sensors 202, a display 204, a processor 206, and a storage device 208. For example, the viewing device 101 may be a wearable computing device (e.g., glasses or helmet), a desktop computer, a vehicle computer, a tablet computer, a navigational device, a portable media device, or a smart phone of a user. The user may be a human user (e.g., a human being), a machine user (e.g., a computer configured by a software program to interact with the viewing device 101), or any suitable combination thereof (e.g., a human assisted by a machine or a machine supervised by a human).

The sensors 202 may include, for example, a proximity or location sensor (e.g., Near Field Communication, GPS, Bluetooth, Wi-Fi), an optical sensor (e.g., camera), an orientation sensor (e.g., gyroscope), an audio sensor (e.g., a microphone), or any suitable combination thereof. For example, the sensors 202 may include a rear-facing camera and a front-facing camera in the viewing device 101. It is noted that the sensors 202 described herein are for illustration purposes; the sensors 202 are thus not limited to the ones described. The sensors 202 may be used to generate internal tracking data of the viewing device 101 to determine what the viewing device 101 is capturing or looking at in the real physical world.

The display 204 may include, for example, a touchscreen display configured to receive a user input via a contact on the touchscreen display. In one example, the display 204 may include a screen or monitor configured to display images generated by the processor 206. In another example, the display 204 may be transparent or semi-opaque so that the user 102 can see through the display 204 (e.g., Heads-Up Display).

The processor 206 may include an AR application 216 for capturing an image of a real-world physical object (e.g., object A 116) and for generating a display of a virtual object in the display 204 of the viewing device 101 corresponding to a texture of the captured image of object A 116. In one example embodiment, the AR application 216 may include a recognition module 214, a texture extraction module 218, and a texture mapping module 220.

The recognition module 214 identifies the object at which the viewing device 101 is pointed. The recognition module 214 may detect, generate, and identify identifiers such as feature points of the physical object being viewed or pointed at by the viewing device 101 using an optical device of the viewing device 101 to capture the image of the physical object. As such, the recognition module 214 may be configured to identify one or more physical objects. The identification of the object(s) may be performed in many different ways. For example, the recognition module 214 may determine feature points of the object(s) based on several image frames of the object(s). The recognition module 214 also determines the identity of the object(s) using any visual recognition algorithm. In another example, a unique identifier may be associated with the object(s). The unique identifier may be a unique wireless signal or a unique visual pattern such that the recognition module 214 can look up the identity of the object(s) based on the unique identifier from a local or remote content database. In another example embodiment, the recognition module 214 includes a facial recognition algorithm to determine an identity of a subject or object.

Furthermore, the recognition module 214 may be configured to determine whether the captured image matches an image locally stored in a local database of images and corresponding additional information (e.g., three-dimensional model and interactive features) on the viewing device 101. In one embodiment, the recognition module 214 retrieves a primary content dataset from the server 110, and generates and updates a contextual content dataset based on an image captured with the viewing device 101.

Figure 3:
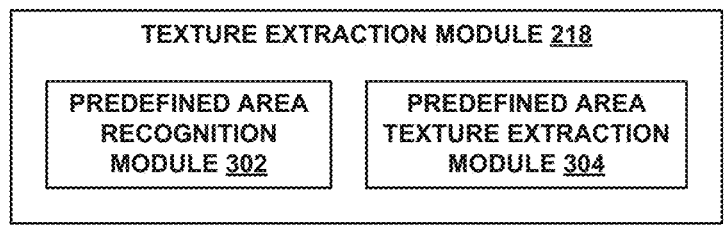
FIG. 3 is a block diagram illustrating an example embodiment of a texture extraction module.

The texture extraction module 218 captures an image of a real-world object with the optical sensor. In particular, the texture extraction module 218 extracts a texture of the image of the real-world object by recording the texture in one or more regions or predefined areas in the image. In another example, the texture extraction module 218 extracts a texture of an image of the real-world object on a periodic basis (e.g., every few millisecond). The texture mapping module 220 then updates a mapping of the texture on the virtual object on the same periodic basis (e.g., every few millisecond). In one example embodiment, the texture extraction module 218 includes a predefined area recognition module 302 and a predefined area texture extraction module 304 as illustrated in FIG. 3.

The predefined area recognition module 302 identifies one or more predefined area in the image of the real-world object. For example, the real-world object includes an outline of a cartoon character on a piece of paper. The predefined area recognition module 302 identifies the outline of the cartoon character as a predefined area. In another example, the predefined area may include specific markings (e.g., QR codes or unique patterns) in specific areas (e.g., corners of a page).

The predefined area texture extraction module 304 extracts one or more texture from the one or more predefined area in the image of the real-world object. For example, the predefined area recognition module 302 extracts texture from the predefined areas and ignores the texture outside the predefined areas of the real-world object.

Referring back to FIG. 2, the texture mapping module 220 retrieves a virtual content based on the recognized real-world object and maps, in real time, the extracted texture to one or more of regions of a virtual object to generate an effect or a visualization based on the extracted texture. For example, the predefined area recognition module 302 determines that the region includes an outline of a drawing of a car on a piece of paper. The predefined area texture extraction module 304 extracts the texture within the outline of the car in the drawing. The texture mapping module 220 retrieves a virtual three-dimensional model of a car with texture based on the extracted texture from the drawing of the car. In one example, the texture mapping module 220 retrieves a virtual three-dimensional model of a sports car based on red marker coloring in the drawing of the car. In another example, the texture mapping module 220 retrieves a virtual three-dimensional model of a police car based on blue pencil coloring in the drawing of the car. As such, the texture mapping module 220 retrieves a virtual content based on a combination of the recognized object, a texture and color of the recognized object.

In another example, the texture mapping module 220 maps the texture of a predefined area in the image of the real-world object to a corresponding area of the virtual object. For instance, the texture mapping module 220 maps the texture of the predefined area to a corresponding surface in a three-dimensional model of the virtual object. For example, the texture of the head of a drawing of a dog is mapped to the head of a virtual dog.

Figure 4:
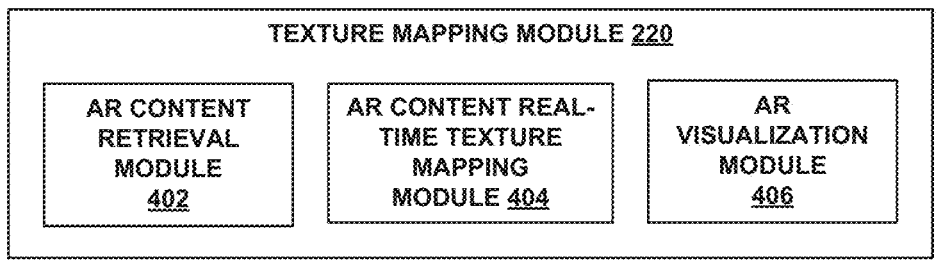
FIG. 4 is a block diagram illustrating an example embodiment of a texture mapping module.

In one example embodiment, the texture mapping module 220 includes an AR content retrieval module 402, an AR content real-time texture mapping module 404, and an AR visualization module 406 as illustrated in FIG. 4.

The AR content retrieval module 402 retrieves a virtual content associated with the recognized real-world object. For example, the AR content retrieval module 402 retrieves a three-dimensional model of Batman in response to the recognition module 214 identifying a bat sign. The virtual content may also include an effect, an animation, a behavior, or a color of the virtual content. For example, a three-dimensional model of a raining virtual cloud is associated with a special color or texture crayon. The texture on the three-dimensional model of a raining virtual cloud is updated in real time based on the types and colors of crayons being used on the drawing.

The AR content real-time texture mapping module 404 detects changes in the texture in the image of the real-world object. For example, the AR content real-time texture mapping module 404 identifies portions of the image of the real-world object with texture changes and dynamically updates in real time a mapping of texture to parts of the virtual content corresponding to the portions of the image with texture changes. In another example, the texture extraction module 218 extracts a texture of an image of the real-world object on a periodic basis. The texture mapping module 220 updates a mapping of the texture to the virtual object in response to detecting changes in the texture of the image of the real-world object.

The AR visualization module 406 generates or modifies a visualization of the virtual content in the captured image of the real-world object. For example, the AR visualization module 406 renders a three-dimensional model of the virtual content in the display 204 of the viewing device 101. The user of the viewing device 101 visually perceives the three-dimensional model as an overlay on top of the captured image. For example, the user may visually perceive a virtual dog sitting on top of a dog house. The viewing device 101 may display the three-dimensional model via a transparent or non-transparent display.

In another example embodiment, the AR visualization module 406 renders a visualization of the characteristic of the virtual content in the display 204 of the viewing device 101. For example, the AR visualization module 406 displays a three-dimensional model of a virtual dog associated with a drawing of a dog. The AR visualization module 406 further animates the three-dimensional model of the dog based on the color or texture of the drawing of the dog in real time (e.g., the virtual dog becomes sleepy as the color of the dog in the drawing changes from brown to dark). In another example, the AR visualization module 406 animates the three-dimensional model of the dog based on the color of a specific area in the drawing of the dog. For example, red paws cause the virtual three-dimensional dog to jump around. In another example, a predefined area in the drawing may be dedicated to the characteristic of the three-dimensional virtual model. The drawing may include a predefined box in a lower corner for the user to color. The color in the predefined box defines the characteristic of the three-dimensional virtual model. In other embodiments, the content and characteristic of the three-dimensional virtual models may be a function of data from sensors 202 of the viewing device 101. For example, if one of the sensors 202 indicates a temperature of 40 degrees Fahrenheit at a specific location in a factory, the AR visualization module 406 generates a visualization of fast-moving exit arrows correlated to the green pedestrian markings on the floor of the factory. As such, the nature and characteristics of the virtual content generated or accessed may be a function of a combination of a recognized object, a color of the recognized object, and data from sensors 202 of the viewing device 101.

In one example embodiment, the AR visualization module 406 receives data from the server 110 to render the visualization. In another example embodiment, the AR visualization module 406 receives the rendered object. The AR visualization module 406 further determines the position and size of the rendered object to be displayed in relation to an image of the object. For example, the AR visualization module 406 places a virtual three-dimensional model of an animated heart with the size and position based on the image of the subject such that the animated heart is displayed on the chest area of the subject with the appropriate size. If the subject is wearing a white T shirt in daylight, the virtual three-dimensional model of an animated heart may beat at a faster pace than that the heart a subject wearing a white T shirt in the dark. The AR visualization module 406 may track the image of the subject and render the virtual object based on the position of the image of the subject in a display 204 of the viewing device 101.

In one example embodiment, the viewing device 101 accesses from a local memory a visualization model (e.g., vector shapes) corresponding to the image of the object (e.g., bridge). In another example, the viewing device 101 receives a visualization model corresponding to the image of the object from the server 110. The viewing device 101 then renders the visualization model to be displayed in relation to an image of the object being displayed in the viewing device 101 or in relation to a position and orientation of the viewing device 101 relative to the object. The AR application 216 may adjust a position of the rendered visualization model in the display 204 to correspond with the last tracked position of the object.

The AR visualization module 406 may include a local rendering engine that generates a visualization of a three-dimensional virtual object overlaid (e.g., superimposed upon, or otherwise displayed in tandem with) on an image of a physical object captured by a camera of the viewing device 101 in the display 204 of the viewing device 101. A visualization of the three-dimensional virtual object may be manipulated by adjusting a position of the physical object (e.g., its physical location, orientation, or both) relative to the camera of the viewing device 101. Similarly, the visualization of the three-dimensional virtual object may be manipulated by adjusting a position of the camera of the viewing device 101 relative to the physical object.

In one example embodiment, the AR visualization module 406 may retrieve three-dimensional models of virtual objects associated with a captured real-world object. For example, the captured image may include a visual reference (also referred to as a marker) that consists of an identifiable image, symbol, letter, number, machine-readable code. For example, the visual reference may include a bar code, a quick response (QR) code, a pattern, or an image that has been previously associated with a three-dimensional virtual object (e.g., an image that has been previously determined to correspond to the three-dimensional virtual object).

In one example embodiment, the AR visualization module 406 identifies the physical object (e.g., a physical telephone), accesses virtual functions (e.g., increase or lower the volume of a nearby television) associated with physical manipulations (e.g., lifting a physical telephone handset) of the physical object, and generates a virtual function corresponding to a physical manipulation of the physical object. In another example, the AR visualization module 406 maps a captured physical control panel (or a Human Machine Interface—HMI) in the real world to create a virtual control panel or virtual HMI.

The storage device 208 may be configured to store a database of identifiers of physical objects, tracking data, and corresponding virtual objects having colors and characteristics as a function of a color of a recognized physical object. In another embodiment, the database may also include visual references (e.g., images) and corresponding experiences (e.g., three-dimensional virtual objects, interactive features of the three-dimensional virtual objects, animations of the three-dimensional virtual objects, characteristics of the three-dimensional virtual objects). For example, the visual reference may include a machine-readable code or a previously identified image (e.g., a picture of a superhero character). The previously identified image of the superhero character may correspond to a three-dimensional virtual model of the superhero character that can be viewed from different angles by manipulating the position of the viewing device 101 relative to the picture of the shoe. Features or powers of the three-dimensional virtual superhero character may be displayed based on the texture and colors of a real-world object.

In one embodiment, the storage device 208 includes a primary content dataset, a contextual content dataset, and a visualization content dataset. The primary content dataset includes, for example, a first set of images and corresponding experiences (e.g., interaction with three-dimensional virtual object models). For example, an image may be associated with one or more virtual object models. The primary content dataset may include a core set of images or the most popular images determined by the server 110. The core set of images may include a limited number of images identified by the server 110. For example, the core set of images may include the images depicting covers of the ten most popular drawings or cartoons and their corresponding experiences (e.g., virtual objects that represent the ten most popular drawings or cartoons). In another example, the server 110 may generate the first set of images based on the most popular or often scanned images received at the server 110. Thus, the primary content dataset does not depend on objects or images scanned by the recognition module 214 of the viewing device 101.

The contextual content dataset includes, for example, a second set of images and corresponding experiences (e.g., three-dimensional virtual object models) retrieved from the server 110. For example, images captured with the viewing device 101 that are not recognized (e.g., by the server 110) in the primary content dataset are submitted to the server 110 for recognition. If the captured image is recognized by the server 110, a corresponding experience may be downloaded at the viewing device 101 and stored in the contextual content dataset. Thus, the contextual content dataset relies on the context in which the viewing device 101 has been used. As such, the contextual content dataset depends on objects or images scanned by the recognition module 214 of the viewing device 101.

In one embodiment, the viewing device 101 may communicate over the network 108 with the server 110 to retrieve a portion of a database of visual references, corresponding three-dimensional virtual objects, and corresponding features of the three-dimensional virtual objects. The network 108 may be any network that enables communication between or among machines, databases, and devices (e.g., the viewing device 101).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 5:
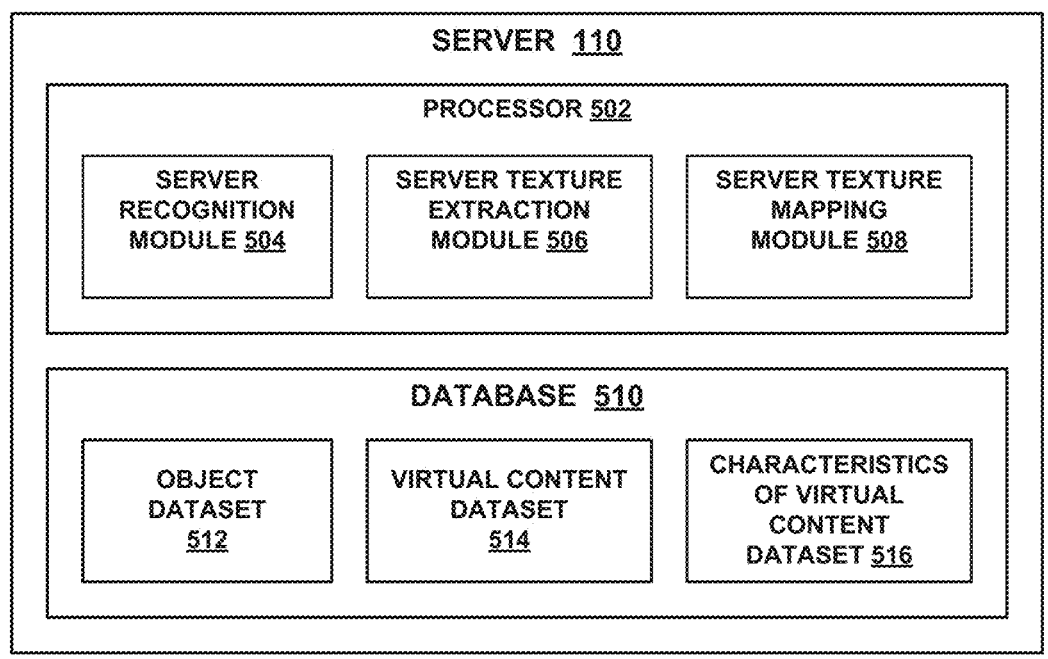
FIG. 5 is a block diagram illustrating an example embodiment of modules of a server.

FIG. 5 is a block diagram illustrating modules (e.g., components) of the server 110. The server 110 includes a processor 502 and a database 510. The processor 502 includes a server recognition module 504, a server texture extraction module 506, and a server texture mapping module 508. The server recognition module 504 operates in a similar way to the recognition module 214 of the viewing device 101. For example, the server recognition module 504 identifies the object A 116 or portions of the object A 116 based on a captured image received from the viewing device 101. In another example, the viewing device 101 already has identified the object A 116 and provides the identification information to the server recognition module 504.

The server texture extraction module 506 also operates in a similar way as the texture extraction module 218 of FIG. 2. For example, the server texture extraction module 506 identifies a texture within a predefined area of a recognized object. The server 110 may query the viewing device 101 for an updated image on a periodic basis (e.g., every second).

The server texture mapping module 508 also operates in a similar way as the texture mapping module 220 of FIG. 2. For example, the server texture mapping module 508 maps an extracted texture to a two or three-dimensional model of a virtual object and generates the textured three-dimensional model for the viewing device 101.

The database 510 may store an object dataset 512, a virtual content dataset 514, and characteristics of virtual content dataset 516. The object dataset 512 may store a primary content dataset and a contextual content dataset. The primary content dataset comprises a first set of images and corresponding virtual object models. The server recognition module 504 determines that a captured image received from the viewing device 101 is not recognized in the object dataset 512, and generates the contextual content dataset for the viewing device 101. The contextual content dataset may include a second set of images and corresponding virtual object models. The virtual content dataset 514 includes models of virtual objects (e.g., a three-dimensional model of an object) to be generated upon receiving a notification associated with an image of a corresponding physical object. The characteristics of virtual content dataset 516 include a table of identified objects and/or colors with characteristics or behaviors (e.g., animation, effects, sound, music, etc.) that correspond to the sample color values from the captured image.

Figure 6:
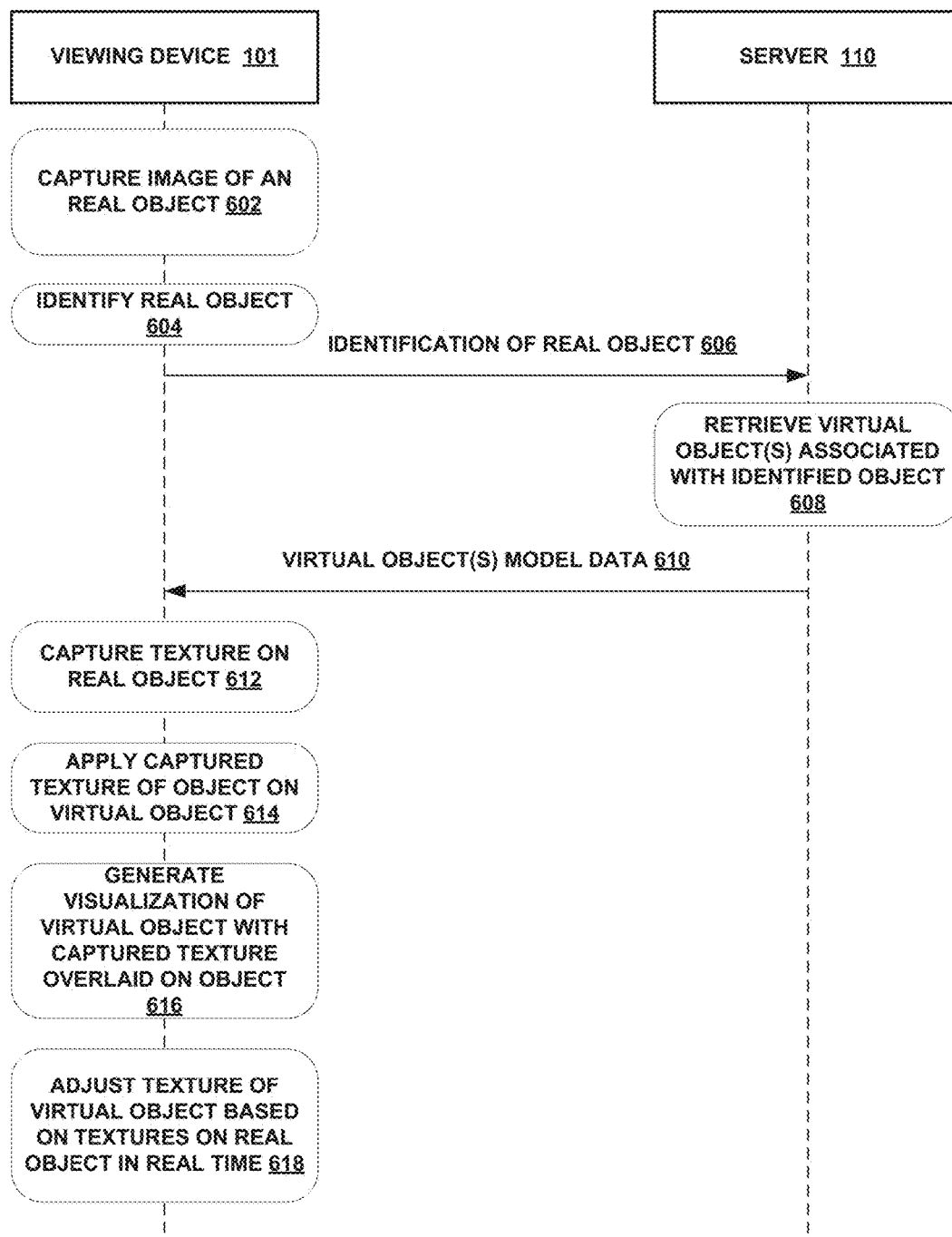
FIG. 6 is an interaction diagram illustrating an example embodiment of interactions between a viewing device and a server.

FIG. 6 is an interaction diagram illustrating an example embodiment of interactions between the viewing device 101 and a server 110. At operation 602, the viewing device 101 captures an image of the object A 116 in a physical environment 114. The viewing device 101 optionally tracks data related to the objects being captured by the viewing device 101. For example, sensors 202 may be used in tracking a temperature or location of the object A 116. At operation 604, the viewing device 101 identifies the object A 116 using a machine vision recognition algorithm or based on predefined unique markings (e.g., QR codes, unique patterns) in predefined regions. In one example embodiment, operation 602 may be implemented using the recognition module 214.

At operation 606, the viewing device 101 communicates an identification of the recognized object to the server 110. At operation 608, the server 110 retrieves a model of a virtual object associated with the identification of the recognized object received from the viewing device 101. In one example embodiment, operation 608 may be implemented using the server recognition module 504 of FIG. 5.

At operation 610, the server 110 communicates the virtual object model data back to the viewing device 101. At operation 612, the viewing device 101 captures a texture on the real-world object at operation 612. In one example embodiment, operation 612 may be implemented using the texture extraction module 218 of FIG. 2.

At operation 614, the server 110 applies the captured texture of the real-world object onto the model of the virtual object. In one example embodiment, operation 614 may be implemented using the texture mapping module 220 of FIG. 2.

At operation 616, the viewing device 101 generates a visualization of the virtual object overlaid on corresponding sample color regions. In one example embodiment, operation 610 may be implemented using the AR visualization module 406 of FIG. 4.

At operation 618, the viewing device 101 captures a texture on the real-world object on a periodic basis (or live) and maps changes to the texture to the model of the virtual object in real time. In one example embodiment, operation 618 may be implemented using the texture mapping module 220 of FIG. 2.

Figure 7:
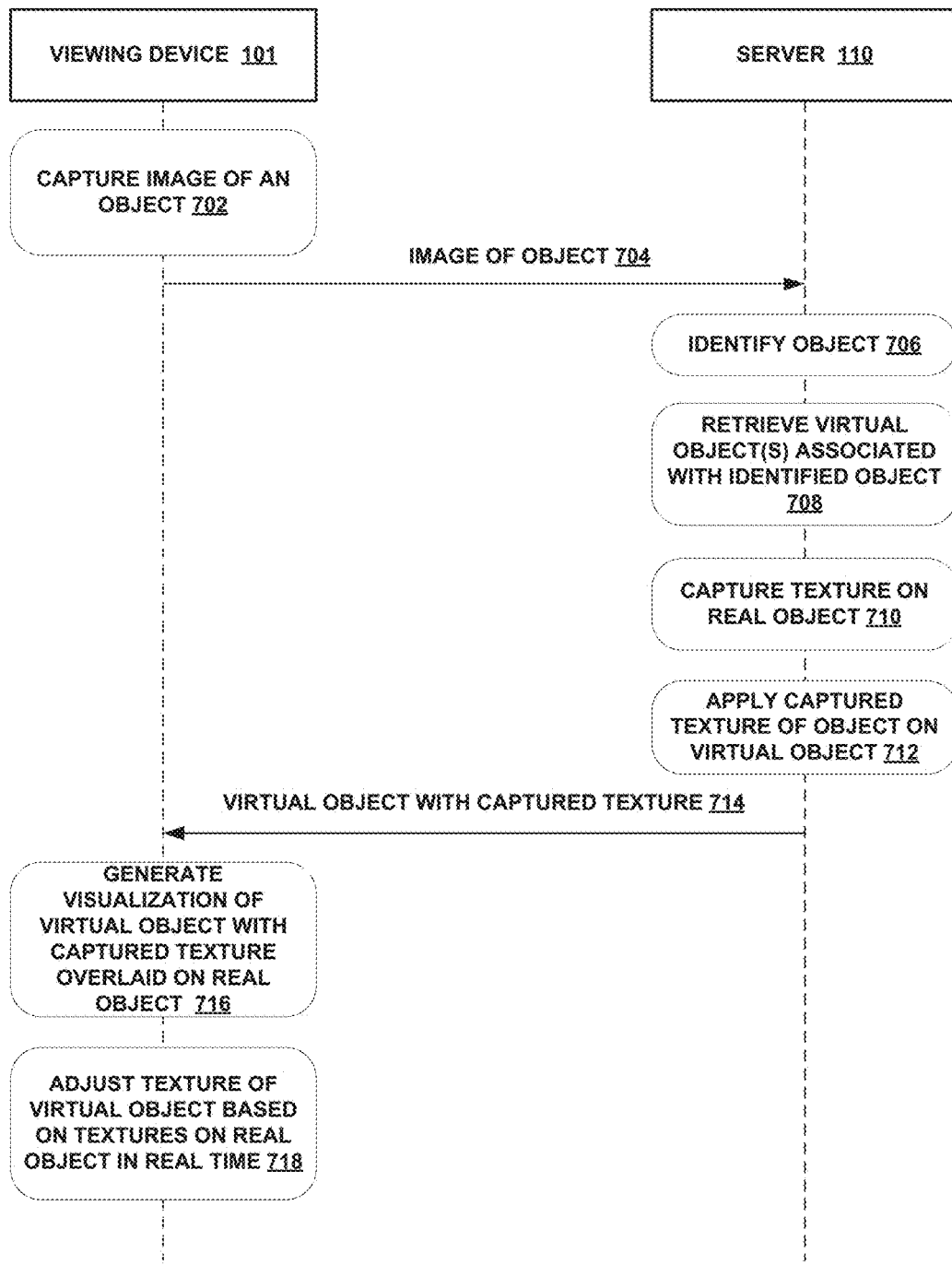
FIG. 7 is an interaction diagram illustrating another example embodiment of interactions between a viewing device and a server.

FIG. 7 is an interaction diagram illustrating another example embodiment of interactions between the viewing device 101 and the server 110. At operation 702, the viewing device 101 captures an image of the object A 116 in a physical environment 114 and sends the image to the server 110. At operation 704, the server 110 identifies the object in the image using a machine vision recognition algorithm or based on predefined unique markings (e.g., QR codes, unique patterns) in predefined regions. In one example embodiment, operation 704 may be implemented using the server recognition module 504.

At operation 706, the viewing device 101 communicates an identification of the recognized object to the server 110. At operation 708, the server 110 retrieves a model of a virtual object associated with the identification of the recognized object received from the viewing device 101. In one example embodiment, operation 708 may be implemented using the server recognition module 504 of FIG. 5.

At operation 710, the server 110 extracts a texture from the image received from the viewing device 101. In one example embodiment, operation 710 may be implemented using the server texture extraction module 506 of FIG. 5.

At operation 712, the server 110 applies the extracted texture to the virtual object or a model of the virtual object. In one example embodiment, operation 712 may be implemented using the server texture mapping module 508 of FIG. 5.

At operation 714, the server 110 communicates the virtual object model with the texture back to the viewing device 101. At operation 716, the viewing device 101 generates a visualization of the virtual object with the previously extracted texture. In one example embodiment, operation 716 may be implemented using the AR visualization module 406 of FIG. 4.

At operation 718, the viewing device 101 adjusts a texture of the virtual object based on changes to the texture of the real-world object in real time. For example, the viewing device 101 dynamically maps changes to the texture to the model of the virtual object in real time without having to re-render the virtual model. In one example embodiment, operation 718 may be implemented using the texture mapping module 220 of FIG. 2.

Figure 8:
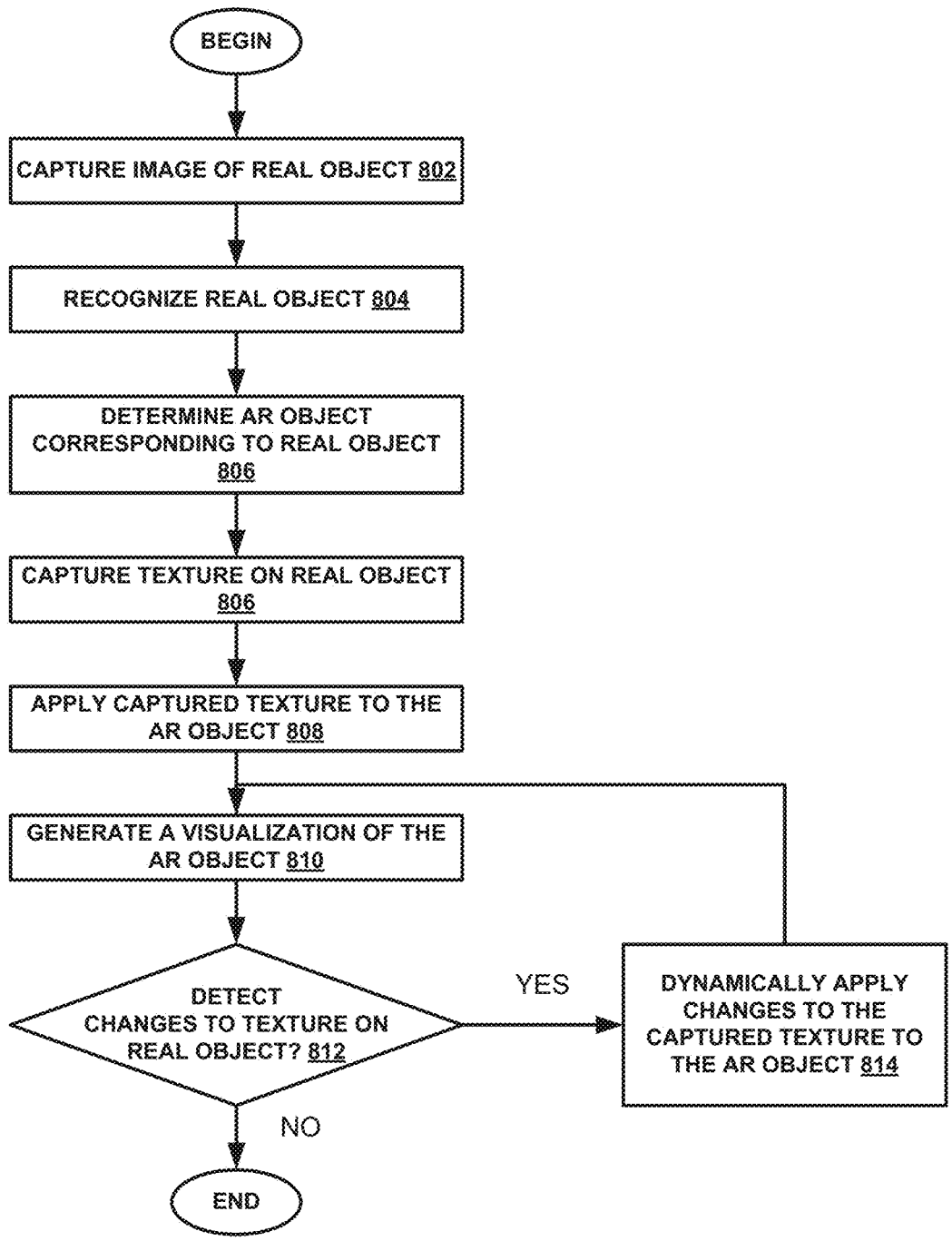
FIG. 8 is a flowchart of a method illustrating an example embodiment of an operation for real-time texture mapping in an augmented reality application.

FIG. 8 is a flowchart of a method illustrating an example operation of real-time texture mapping for an AR system. At operation 802, the viewing device 101 captures an image of an object.

At operation 804, the viewing device 101 recognizes the object using machine vision technology or unique identifiers. At operation 806, the viewing device 101 determines an AR object corresponding to the recognized object. In one example embodiment, operations 804 and 806 may be implemented using the recognition module 214 of FIG. 2 and the AR content retrieval module 402 of FIG. 4.

At operation 806, the viewing device 101 captures the texture of the real-world object. In one example embodiment, operation 806 may be implemented using the texture extraction module 218 of FIG. 2.

At operation 808, the viewing device 101 applies the texture to the AR object. For example, the viewing device 101 maps the texture to corresponding regions in the AR object. In one example embodiment, operation 808 may be implemented using the texture mapping module 220 of FIG. 2.

At operation 810, the viewing device 101 generates a visualization of the AR object with the texture applied to the AR object in a display of the viewing device 101. In one example embodiment, operation 808 may be implemented using the AR visualization module 406 of FIG. 2.

At operation 812, the viewing device 101 detects changes to the texture of the real-world object. The detection may be performed in real time or on a periodic basis. In one example embodiment, operation 812 may be implemented using the AR content real-time texture mapping module 404 of FIG. 4.

At operation 814, if the viewing device 101 detects changes to the texture on the real-world object, the viewing device 101 dynamically applies the changes to the captured texture to the AR object in real time.

Figure 9:
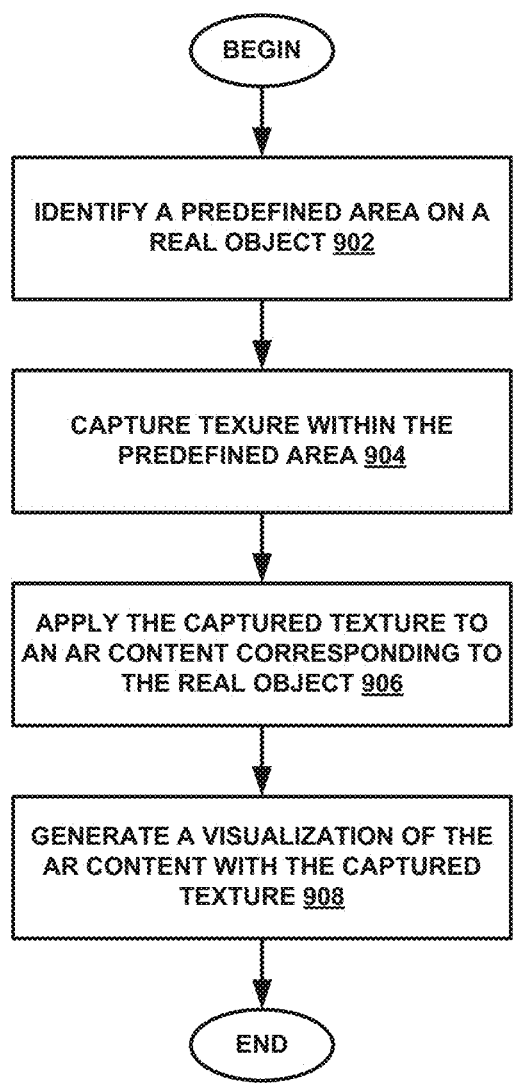
FIG. 9 is a flowchart of a method illustrating another example embodiment of an operation for real-time texture mapping in an augmented reality application.

FIG. 9 is a flowchart of a method illustrating an example operation of real-time texture mapping for an AR system. At operation 902, the viewing device 101 identifies a predefined area on a real-world object. In one example embodiment, operation 902 may be implemented using the predefined area recognition module 302 of FIG. 3.

At operation 904, the viewing device 101 captures texture within the predefined areas previously identified in operation 902. In one example embodiment, operation 904 may be implemented using the predefined area texture extraction module 304 of FIG. 3.

At operation 906, the viewing device 101 applies the captured texture to an AR content corresponding to the real-world object. In one example embodiment, operation 906 may be implemented using the texture mapping module 220 of FIG. 2.

At operation 908, the viewing device 101 generates a visualization of the AR content with the captured texture. In one example embodiment, operation 908 may be implemented using the AR visualization module 406 of FIG. 4.

Figure 10:
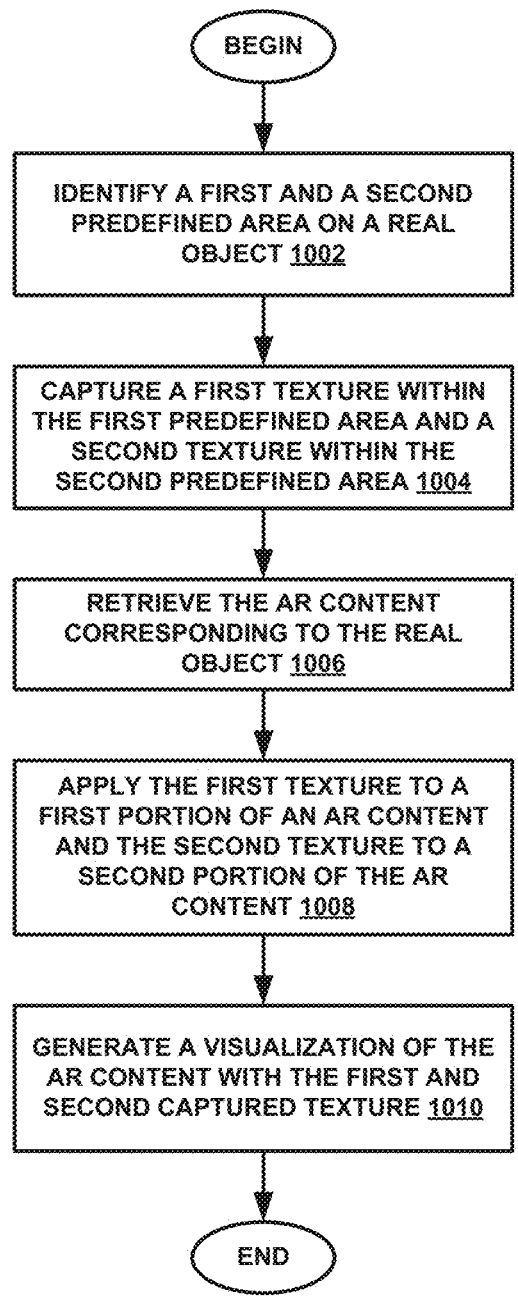
FIG. 10 is a flowchart of a method illustrating another example embodiment of an operation for real-time texture mapping in an augmented reality application.

FIG. 10 is a flowchart of a method illustrating another example operation of real-time texture mapping for an AR system. At operation 1002, the viewing device 101 identifies a first and a second predefined area on a real object. In one example embodiment, operation 1002 may be implemented using the predefined area recognition module 302 of FIG. 3. At operation 1004, the viewing device 101 captures a first texture within the first predefined area and a second texture within the second predefined area. In one example embodiment, operation 1004 may be implemented using the predefined area texture extraction module 304 of FIG. 3. At operation 1006, the viewing device 101 retrieves or accesses an AR content corresponding to the real object.

At operation 1008, the viewing device 101 applies the first texture to a first portion of the AR content and the second texture to a second portion of the AR content. In one example embodiment, operation 1008 may be implemented using the texture mapping module 220 of FIG. 2.

At operation 1010, the viewing device 101 generates a visualization of the AR content with the first and second captured texture. In one example embodiment, operation 1010 may be implemented using the AR visualization module 406 of FIG. 4.

Figure 11:
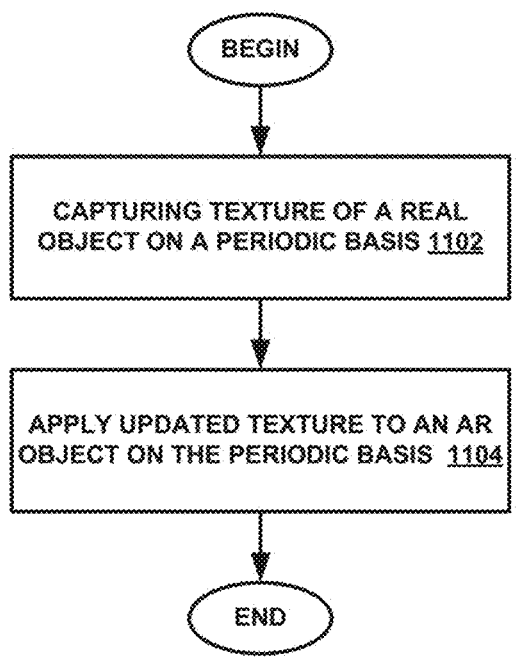
FIG. 11 is a flowchart of a method illustrating another example embodiment of an operation for real-time texture mapping in an augmented reality application.

FIG. 11 is a flowchart of a method illustrating an example operation of real-time texture mapping for an AR system. At operation 1102, the viewing device 101 captures texture of a real object on a periodic basis. At operation 1104, the viewing device 101 applies updated texture to an AR object on a periodic basis. In one example, both texture capture and texture mapping are performed on the same periodic basis. In another example, the texture capture is performed more frequently that the texture mapping. In one example embodiment, operations 1102 and 1104 may be implemented using the AR content real-time texture mapping module 404 of FIG. 4.

Figure 12A:
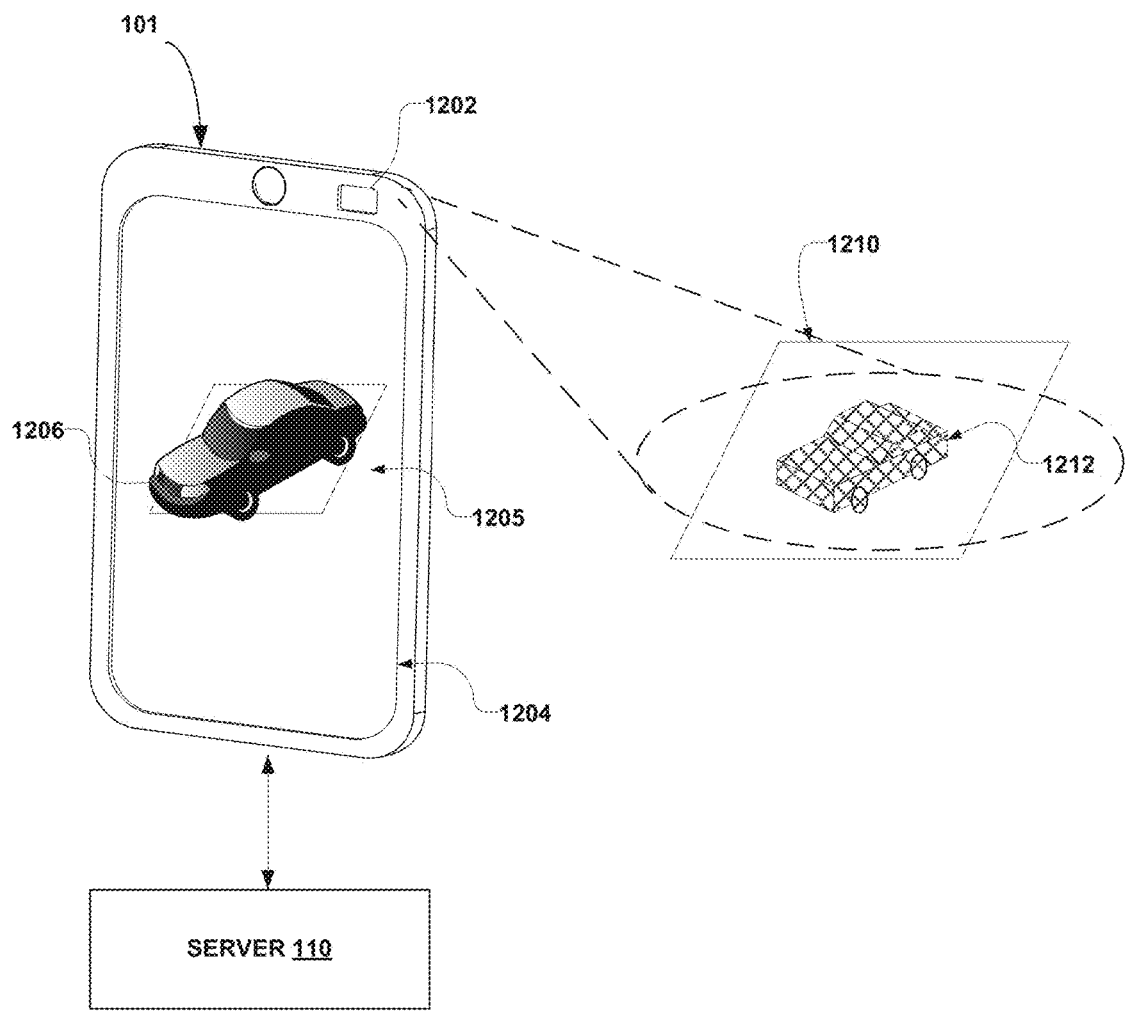
FIG. 12A is a diagram illustrating an example operation of real-time texture mapping in an augmented reality application.

FIG. 12A is a diagram illustrating an example operation of a real-time texture mapping for an AR system. The viewing device 101 includes a handheld mobile device (e.g., viewing device 101) having a rear view camera 1202 and a touch sensitive display 1204. The viewing device 101 may be pointed at a real-world scene comprising a colored drawing on a paper 1210. The rear view camera 1202 captures an image of the paper 1210 and displays a picture 1205 of the paper 1210 in the display 1204. Optionally, identifiers (e.g., QR code, or specific patterns) and tracking data related to the paper 1210 may be recognized by the viewing device 101 based on the picture 1205 so as to identify the drawing on the paper 1210. For example, markings on the paper 1210 are associated with a three-dimensional model of a virtual car 1206.

In one example embodiment, the viewing device 101 extracts the texture of the drawing of the car 1212 on the paper 1210. The viewing device 101 then maps the extracted texture to the virtual car 1206.

In another example embodiment, the viewing device 101 communicates an identification of the identified paper 1210 to the server 110. The server 110 retrieves or generates a three-dimensional model of a virtual object associated with the paper 1210. The server 110 then communicates the three-dimensional model back to the viewing device 101. The viewing device 101 generates a visualization of the three-dimensional model of the virtual object including the extracted texture. For example, the visualization may include the picture 1205 of the virtual car with the texture extracted from the drawing of the car 1212 on the paper 1210.

Figure 12B:
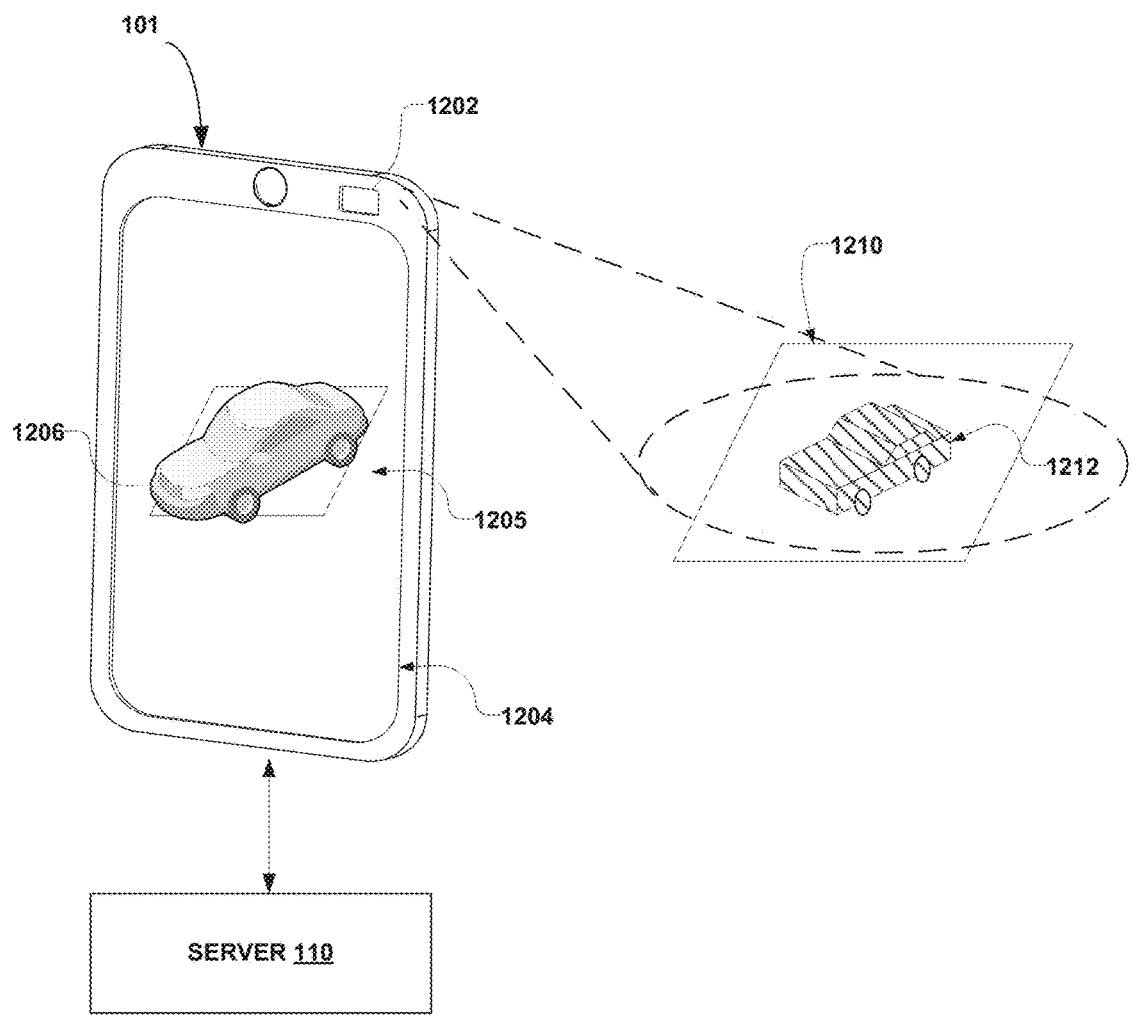
FIG. 12B is a diagram illustrating an example operation of real-time texture mapping in an augmented reality application.

FIG. 12B is a diagram illustrating an example operation of a real-time texture mapping for an AR system. The viewing device 101 detects that the texture 1213 of the drawing of the car 1212 on the paper 1210 has changed from the previously extracted textures. The viewing device 101 then dynamically updates and maps the new extracted texture to the virtual car 1206 in real time.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
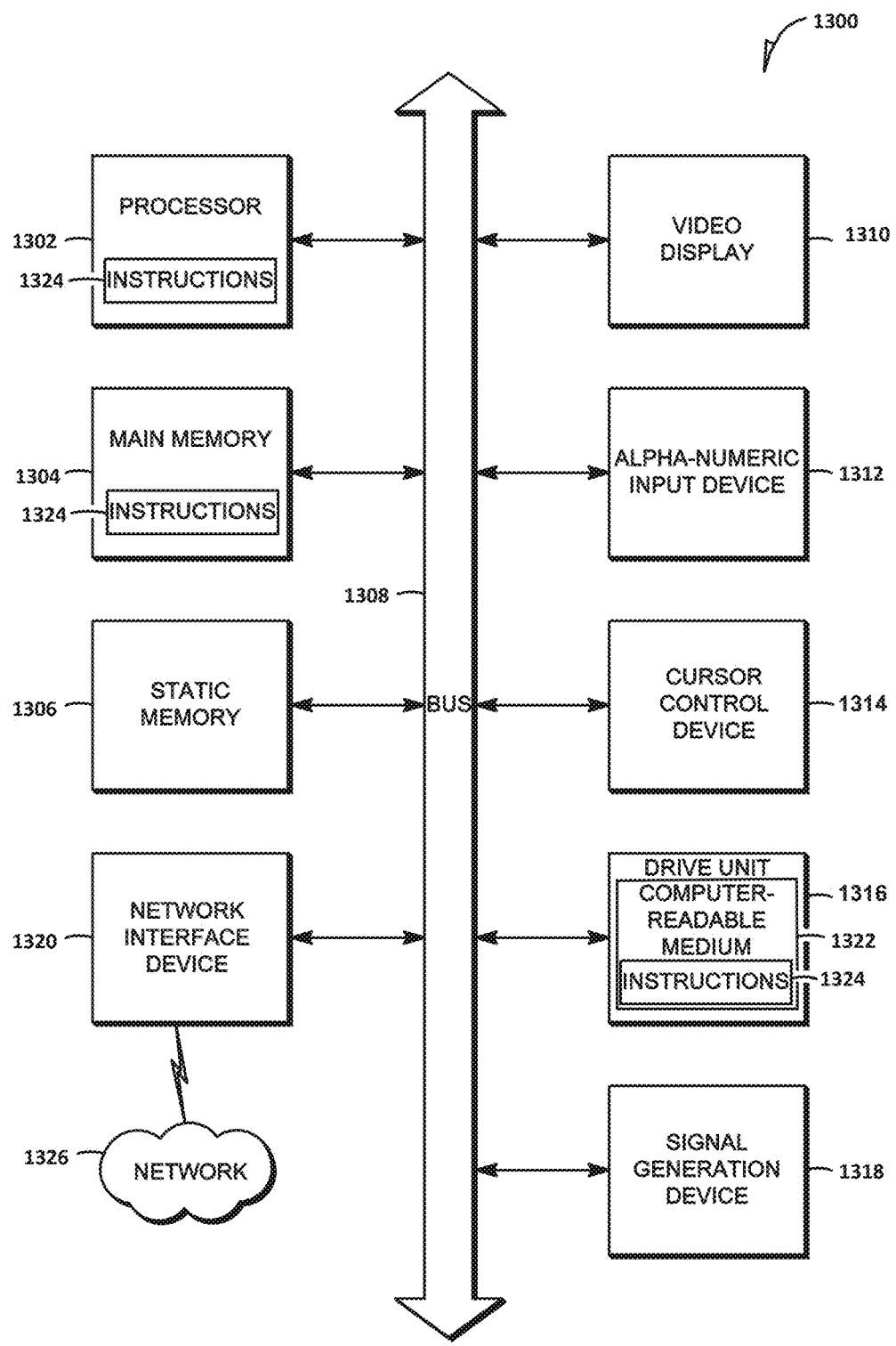
FIG. 13 is a block diagram illustrating components of a machine, according to some example embodiments, able to read instructions from a machine-readable medium and perform any one or more of the methodologies discussed herein.

FIG. 13 is a block diagram of a machine in the example form of a computer system 1300 within which instructions 1324 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation (or cursor control) device 1314 (e.g., a mouse), a disk drive unit 1316, a signal generation device 1318 (e.g., a speaker) and a network interface device 1320.

Machine-Readable Medium

The disk drive unit 1316 includes a computer-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media. The instructions 1324 may also reside, completely or at least partially, within the static memory 1306.

While the machine-readable medium 1322 is shown in an example embodiment to be a single medium, the term "machine-readable medium" may include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding or carrying instructions (e.g., instructions 1324) for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Example Mobile Device

Figure 14:
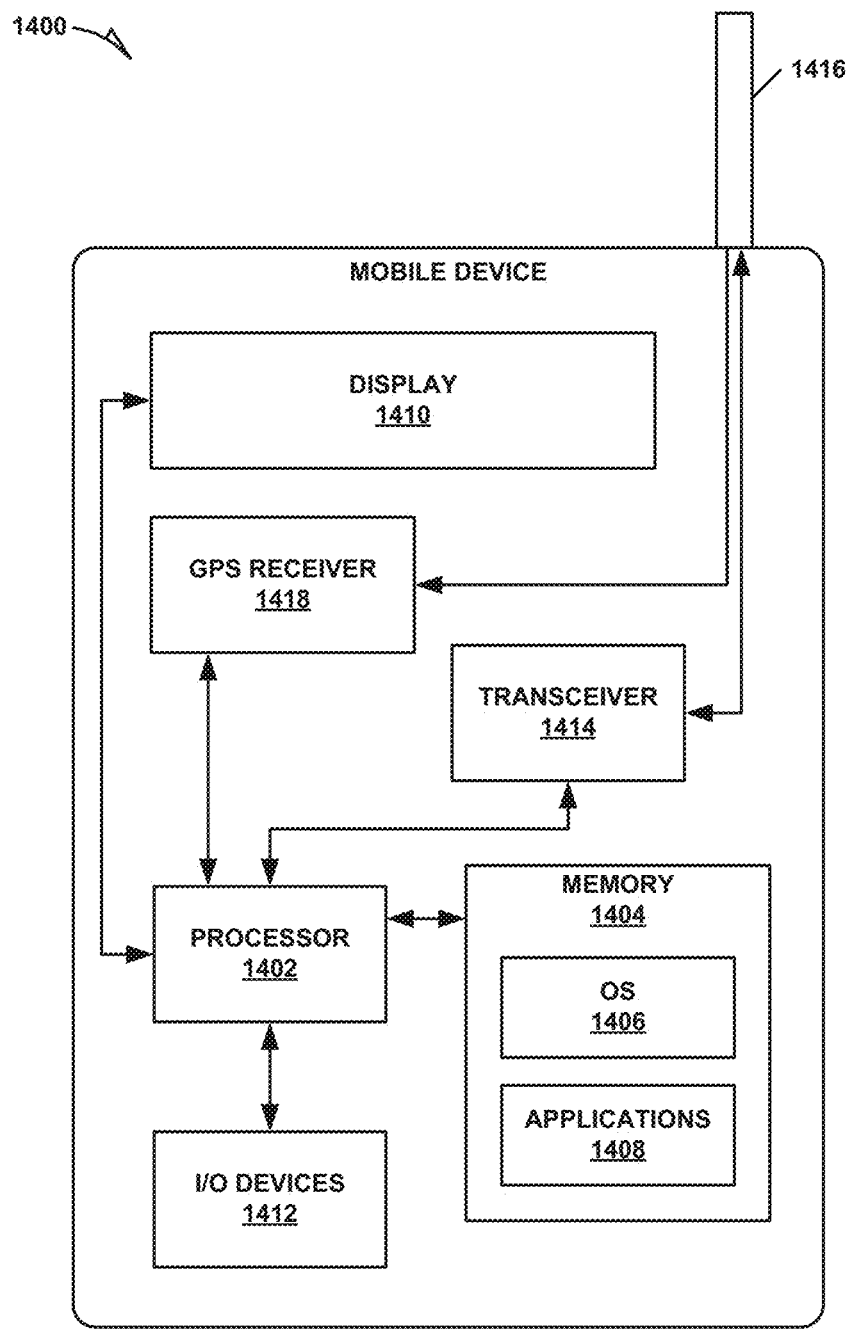
FIG. 14 is a block diagram illustrating a mobile device, according to an example embodiment, able to read instructions from a machine-readable medium and perform any one or more of the methodologies discussed herein.

FIG. 14 is a block diagram illustrating a mobile device 1400, according to an example embodiment. The mobile device 1400 may include a processor 1402. The processor 1402 may be any of a variety of different types of commercially available processors 1402 suitable for mobile devices 1400 (for example, an XScale architecture microprocessor, a microprocessor without interlocked pipeline stages (MIPS) architecture processor, or another type of processor 1402). A memory 1404, such as a random access memory (RAM), a flash memory, or other type of memory, is typically accessible to the processor 1402. The memory 1404 may be adapted to store an operating system (OS) 1406, as well as application programs 1408, such as a mobile location enabled application that may provide location-based services to a user. The processor 1402 may be coupled, either directly or via appropriate intermediary hardware, to a display 1410 and to one or more input/output (I/O) devices 1412, such as a keypad, a touch panel sensor, a microphone, and the like. Similarly, in some embodiments, the processor 1402 may be coupled to a transceiver 1414 that interfaces with an antenna 1416. The transceiver 1414 may be configured to both transmit and receive cellular network signals, wireless data signals, or other types of signals via the antenna 1416, depending on the nature of the mobile device 1400. Further, in some configurations, a GPS receiver 1418 may also make use of the antenna 1416 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
capturing, by a viewing device, an image of a real-world object, the image captured using an optical sensor of the viewing device;
identifying, from the image of the real-world object, a first predefined area of the real-world object captured in the image;
identifying the real-world object based on the captured image;
retrieving a virtual object corresponding to the real-world object;
generating a visualization of the virtual object on a display of the viewing device;
after generating the visualization of the virtual object on the display of the viewing device, capturing a subsequent image of the real-world object;
determining, from the subsequent image, that a texture has been added within the first predefined area of the real-world object;
identifying, based on the texture within the first predefined area of the real-world object, a virtual object behavior mapped to the texture being within the first predefined area of the real-world object, the virtual object behavior identifying a predetermined behavior to be exhibited by the virtual object; and
updating the visualization of the virtual object on the display to cause the virtual object to exhibit the predetermined behavior identified by the virtual object behavior.

2. The method of claim 1, further comprising:
extracting the texture from the first predefined area in the image of the real-world object.

3. The method of claim 2, further comprising:
mapping the texture of the first predefined area in the image to a corresponding area of the virtual object.

4. The method of claim 3, further comprising:
mapping the texture of the first predefined area to a corresponding surface in a three-dimensional model of the virtual object.

5. The method of claim 1, further comprising:
mapping the texture to a portion of the virtual content corresponding to the first predetermined area.

6. The method of claim 5, further comprising:
dynamically updating in real time the visualization of a portion of the virtual content corresponding to the first predetermined area to reflect the texture added to the first predetermined area.

7. The method of claim 1, further comprising:
extracting the texture on a periodic basis; and
updating a mapping of the texture to the virtual object on the periodic basis.

8. The method of claim 1, wherein
the texture comprises a color and a visual pattern in the image of the real-world object.

9. The method of claim 1, further comprising rendering the visualization of the virtual content in a transparent display of the viewing device, the virtual content visually perceived as an overlay to the real-world object.

10. The method of claim 1, wherein the predetermined behavior is an animated movement to be exhibited by the virtual object.

11. The method of claim 10, wherein the predetermined behavior further includes sound to be presented while the virtual object is exhibiting the animated movement.

12. A non-transitory machine-readable medium comprising instructions that, when executed by one or more computer processors of a viewing device, cause the viewing device to perform operations comprising:
capturing an image of a real-world object, the image captured using an optical sensor of the viewing device;
identifying, from the image of the real-world object, a first predefined area of the real-world object captured in the image;
identifying the real-world object based on the captured image;
retrieving a virtual object corresponding to the real-world object;
generating a visualization of the virtual object on a display of the viewing device;
after generating the visualization of the virtual object on the display of the viewing device, capturing a subsequent image of the real-world object;
determining, from the subsequent image, that a texture has been added within the first predefined area of the real-world object;
identifying, based on the texture within the first predefined area of the real-world object, a virtual object behavior mapped to the texture being within the first predefined area of the real-world object, the virtual object behavior identifying a predetermined behavior to be exhibited by the virtual object; and
updating the visualization of the virtual object on the display to cause the virtual object to exhibit the predetermined behavior identified by the virtual object behavior.

13. A viewing device comprising:
one or more computer processors; and
one or more computer-readable mediums storing instructions that, when executed by the one or more computer processors, cause the viewing device to perform operations comprising:
capturing an image of a real-world object, the image captured using an optical sensor of the viewing device;
identifying, from the image of the real-world object, a first predefined area of the real-world object captured in the image;
identifying the real-world object based on the captured image;
retrieving a virtual object corresponding to the real-world object;
generating a visualization of the virtual object on a display of the viewing device;
after generating the visualization of the virtual object on the display of the viewing device, capturing a subsequent image of the real-world object;
determining, from the subsequent image, that a texture has been added within the first predefined area of the real-world object;
identifying, based on the texture within the first predefined area of the real-world object, a virtual object behavior mapped to the texture being within the first predefined area of the real-world object, the virtual object behavior identifying a predetermined behavior to be exhibited by the virtual object; and
updating the visualization of the virtual object on the display to cause the virtual object to exhibit the predetermined behavior identified by the virtual object behavior.

14. The viewing device of claim 13, the operations further comprising:
extracting the texture from the first predefined area in the image of the real-world object.

15. The viewing device of claim 14, the operations further comprising:
mapping the texture of the first predefined area in the image to a corresponding area of the virtual object.

16. The viewing device of claim 15, the operations further comprising:
mapping the texture of the first predefined area to a corresponding surface in a three-dimensional model of the virtual object.

17. The viewing device of claim 13, the operations further comprising:
mapping the texture to a portion of the virtual content corresponding to the first predetermined area.

18. The viewing device of claim 17, the operations further comprising:
dynamically updating in real time the visualization of a portion of the virtual content corresponding to the first predetermined area to reflect the texture added to the first predetermined area.

19. The viewing device of claim 13, the operations further comprising:
extracting the texture on a periodic basis; and
updating a mapping of the texture to the virtual object on the periodic basis.

20. The viewing device of claim 13, wherein the texture comprises a color and a visual pattern in the image of the real-world object.

21. The viewing device of claim 13, further comprising rendering the visualization of the virtual content in a transparent display of the viewing device, the virtual content visually perceived as an overlay to the real-world object.

22. The viewing device of claim 13, wherein the predetermined behavior is an animated movement to be exhibited by the virtual object.

23. The viewing device of claim 22, wherein the predetermined behavior further includes sound to be presented while the virtual object is exhibiting the animated movement.

* * * * *